United States Patent
Slocum

(10) Patent No.: US 7,527,170 B2
(45) Date of Patent: May 5, 2009

(54) WEATHERPROOF CARD HOLDER/DISPENSER FOR VEHICLE EXTERIORS

(76) Inventor: Derek Slocum, 607 E. 7th St., Upland, CA (US) 91786

( * ) Notice: Subject to any disclaimer, the term of this patent is extended or adjusted under 35 U.S.C. 154(b) by 509 days.

(21) Appl. No.: 10/911,184

(22) Filed: Aug. 3, 2004

(65) Prior Publication Data
US 2006/0027593 A1   Feb. 9, 2006

(51) Int. Cl.
B65H 1/08 (2006.01)
(52) U.S. Cl. .............................. 221/232; 221/45; 221/46
(58) Field of Classification Search .................. 221/232, 221/45, 46
See application file for complete search history.

(56) References Cited

U.S. PATENT DOCUMENTS

| 1,739,801 | A | * | 12/1929 | Pitts | 220/483 |
|---|---|---|---|---|---|
| 3,899,229 | A | * | 8/1975 | Ackeret | 312/9.57 |
| 4,792,058 | A | * | 12/1988 | Parker | 221/232 |
| 5,060,794 | A | * | 10/1991 | Linn et al. | 206/232 |
| 5,224,373 | A | * | 7/1993 | Williams et al. | 73/29.02 |
| 5,595,300 | A | * | 1/1997 | Paik et al. | 206/449 |
| 5,645,203 | A | * | 7/1997 | Tappenden | 224/482 |
| 5,850,957 | A | * | 12/1998 | Morris | 224/277 |
| 6,520,367 | B1 | * | 2/2003 | Piroch | 220/483 |
| 2005/0079262 | A1 | * | 4/2005 | Oeschger | 426/516 |
| 2005/0092768 | A1 | * | 5/2005 | Poole, Jr. | 221/232 |
| 2006/0201037 | A1 | * | 9/2006 | Blau | 40/124.06 |

* cited by examiner

*Primary Examiner*—Patrick Mackey
*Assistant Examiner*—Michael E. Butler
(74) *Attorney, Agent, or Firm*—Donald W. Meeker

(57) ABSTRACT

A card holding dispenser attaches to vehicle and building exteriors. A casing has an interior compartment for holding cards. An elevated compartment lip engages a lid interior over the lip to seal the cards from wind and water. A snap latch lock maintains the lid closed. A flat back compartment surface attaches to an external surface.

8 Claims, 3 Drawing Sheets

WEATHERPROOF CARD HOLDER/DISPENSER FOR VEHICLE EXTERIORS

BACKGROUND OF THE INVENTION

1. Field of the Invention

The present invention relates to business card holders and particularly to an weatherproof business card holder and dispenser, which may be attached to a vehicle exterior.

2. Description of the Prior Art

Essentially, business cards serve to identify persons and/or business enterprises, and the occupation, profession, or trade of such person or the particular business activity of the business enterprise. Consequently, business cards are capable of being used as an advertisement instrumentality since they effectively bring to the immediate attention of anyone reading a particular card of the availability for hire or employment of the identified individual or business enterprise to perform certain services for hire. Obviously, the potential volume of business or employment and, thus, the monetary return that can be generated by a business card functioning simply as an advertisement instrumentality is directly related to the number of persons who are made aware of the card and actually read the same. The more persons viewing a particular business card, the greater will be the potential for increasing the business activities of the business card owner. When a service vehicle or company car is parked outside an establishment, the advertisement on the vehicle often draws the attention of potential customers in the surrounding area.

Prior art U.S. Pat. No. 6,206,225, issued Mar. 27, 2001 to Fox, claims a portable device for displaying dispensing card-like members, which includes a generally rectangular box having a display storage cavity formed adjacent its forward wall for supporting card-like member in a vertical position for visible display. A main storage cavity is provided for storing a reserve supply of additional card-like members in a vertical position from which they may be easily dispensed. A support plate is removably attachable to the rear surface of the box, and the support plate in turn may be securely attached to a vertical support surface.

Prior art U.S. Pat. No. 5,850,957, issued Dec. 12, 1998 to Morris, provides a business card dispenser, mountable on an exterior surface of a vehicle used by a business person, which stores business cards or other promotional materials and is accessible to prospective customers located in the vicinity of the vehicle so as to permit the prospective customers to remove promotional materials from the business card dispenser. The business card dispenser preferably includes a base mountable on the vehicle, e.g. by adhesive strips, and a card holder mounted on the base and receiving the promotional materials. The card holder is preferably removably mounted on the base to permit its removal, thus preventing theft or damage to the card holder. The card holder also incorporates measures to protect the cards from the elements. Indicia preferably are provided on the vehicle in the vicinity of the business card dispenser to draw prospective customers' attention to the business card dispenser.

Prior art U.S. Pat. No. 5,615,800, issued Apr. 1, 1997 to Meyers, concerns an integrated business card and information dispenser device, for dispensing one or more pieces of information or business cards with each stroke of the dispensing lever, which can be mounted permanently or temporarily using a variety of mounting means. The device has a business card and information storage area, a dispensing means, and a locking article storage area. The device is waterproof and has various indicia display surfaces.

Prior art U.S. Pat. No. 5,645,203, issued Jul. 8, 1997 to Tappenden, shows a holder for supporting a plurality of business cards relative to a vehicle. The inventive device includes a base plate that has a mounting assembly for coupling to a vehicle. A dispensing assembly projects from the base plate and supports a plurality of stacked business cards for individual reception by a person.

Prior art U.S. Pat. No. 1,739,801, issued Dec. 17, 1929 to Pitts, provides an advertising device that comprises a receptacle for advertising circulars, cards, or other matter, which has vacuum cup attachments for mounting the device to any smooth surface.

Prior art U.S. Pat. No. D365,231, issued Dec. 19, 1995 to Hopper, puts forth the ornamental design for a display box for business cards, which may be mounted on and then held in place by a vehicle window.

Prior art U.S. Pat. No. 6,010,031, issued Jan. 4, 2000 to Fox, describes an apparatus for dispensing articles bearing information thereon, which is made of a box-like container having a hinged lid for loading articles such as business cards. The front side of the box, opposite the hinged side, is slightly shorter than the other sides, whereby a slit is formed between the lid and the front side. A spring biasing means is attached to the bottom of the box and lifts a supporting surface and the business cards towards the lid. Interested individuals may remove the cards through the slit and the spring biasing means will replenish the cards.

Prior art U.S. Pat. No. 6,520,367, issued Feb. 18, 2003 to Piroch, illustrates an article-dispensing container for dispensing articles from a container that protects the articles prior to dispensing and is easily and conveniently mountable on a vertical support. The article-dispensing container includes a receptacle that comprises a lower portion, which has a cavity and an upper opening, and an upper lid portion, which is pivotally coupled to the lower portion adjacent to the upper opening of the receptacle.

Prior art U.S. Pat. No. D325,048, issued Mar. 31, 1992 to Penner, depicts the ornamental design for magnetized business card holder, which has a receptacle for a display card and a larger receptacle for a plurality of business cards.

Prior art U.S. Pat. No. 4,889,268, issued Dec. 26, 1989 to Shubeck, discloses a card display device for automobile windows which comprises a strip of material overlapped upon itself to form a series of pockets for holding cards or other advertising material. The top end of the strip is reversely turned to form a retaining flange for locking the strip on the top edge of an automobile windowpane when closed. In the preferred embodiment the strip extends beyond the flange perpendicular to the back of the strip thereby forming a handle for carrying and positioning the card holder.

What is needed is a secure mounting card holding and dispensing structure with a lid that pivots up from one side to the other and locks down in combination with a waterproof casing and secure attaching surface for long term attachment to an outside of a vehicle.

SUMMARY OF THE INVENTION

An object of the present invention is to provide a card holding and dispensing structure with a lid that pivots up from one side to the other and snap locks closed in combination with a waterproof casing for long term attachment to an outside of a vehicle or a building.

A related object of the present invention is to provide a card holding and dispensing structure with a lid slidable down over a raised lip from the interior card holding compartment, which seals tight against the wind and the rain.

In brief, a card holding dispenser device is especially adapted for exterior use with windproofing and waterproofing on moving vehicles and building exteriors. The device includes a casing comprising an interior compartment for holding a plurality of cards and an elevated top lip which engages the interior of the lid with a weatherproof tight friction fit when the device is closed. A snap latch lock maintains the lid closed. The interior card compartment has a flat back surface to receive high strength double back tape or hook and loop fasteners or a magnetic strip (for mounting on a metal surface) for mounting the device to an exterior vertical surface with the rear casing surface remaining flush to the exterior vertical surface, preferably a vehicle.

The front casing surface further comprises a recessed front portion adapted to receive a single card therein for display purposes. The recessed front portion has a transparent front covering, which is preferably contiguous with and conforming to the shape of the front casing surface. The transparent front covering is configured to snap into the recessed front portion with a tight friction fit, forming a sealed connection between the transparent front covering and the recessed front portion to prevent wind and water from contacting the display card in the recessed front portion.

The device also comprises a lid mounted on the casing by a pivoting snap together hinge, which allows the lid to pivot open for accessing the interior compartment, enabling the removal of one or more cards or filling the card compartment. The lid is adapted to pivot open vertically with the rear lid surface moving along an exterior vertical surface on which the device is mounted. The lid and casing have an interconnecting means with the lid friction fitting over a raised lip around the interior card carrying compartment for sealing the interior compartment in a closed position of the lid to prevent wind and water from entering therein. A snap lock holds the lid securely closed.

An advantage of the present invention is that it makes business cards accessible to potential customers.

Another advantage of the present invention is that it will remain attached to the vehicle.

An additional advantage of the present invention is that it protects the cards from the weather.

Yet another advantage of the present invention is that it is inexpensive to manufacture.

Still another advantage of the present invention is that it generates more business for a company.

BRIEF DESCRIPTION OF THE DRAWINGS

These and other details of my invention will be described in connection with the accompanying drawings, which are furnished only by way of illustration and not in limitation of the invention, and in which drawings:

FIG. 2A is an enlarged exploded view of the hinge connection between the casing and the lid;

BEST MODE FOR CARRYING OUT THE INVENTION

Figure 1:
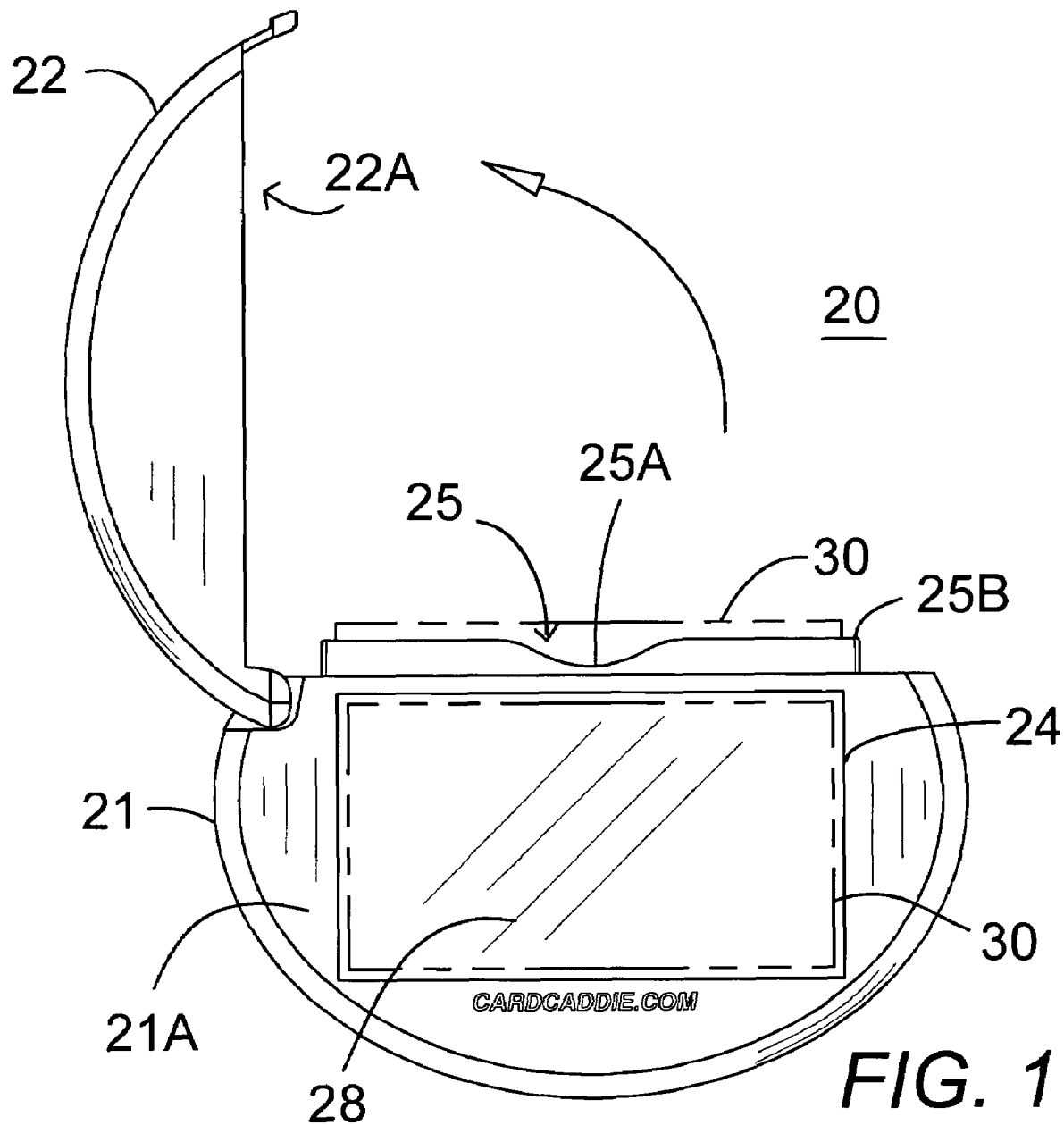
FIG. 1 is a front elevational view of the card holder dispenser of the present invention showing the lid open to reveal the cards contained therein.
Figure 2:
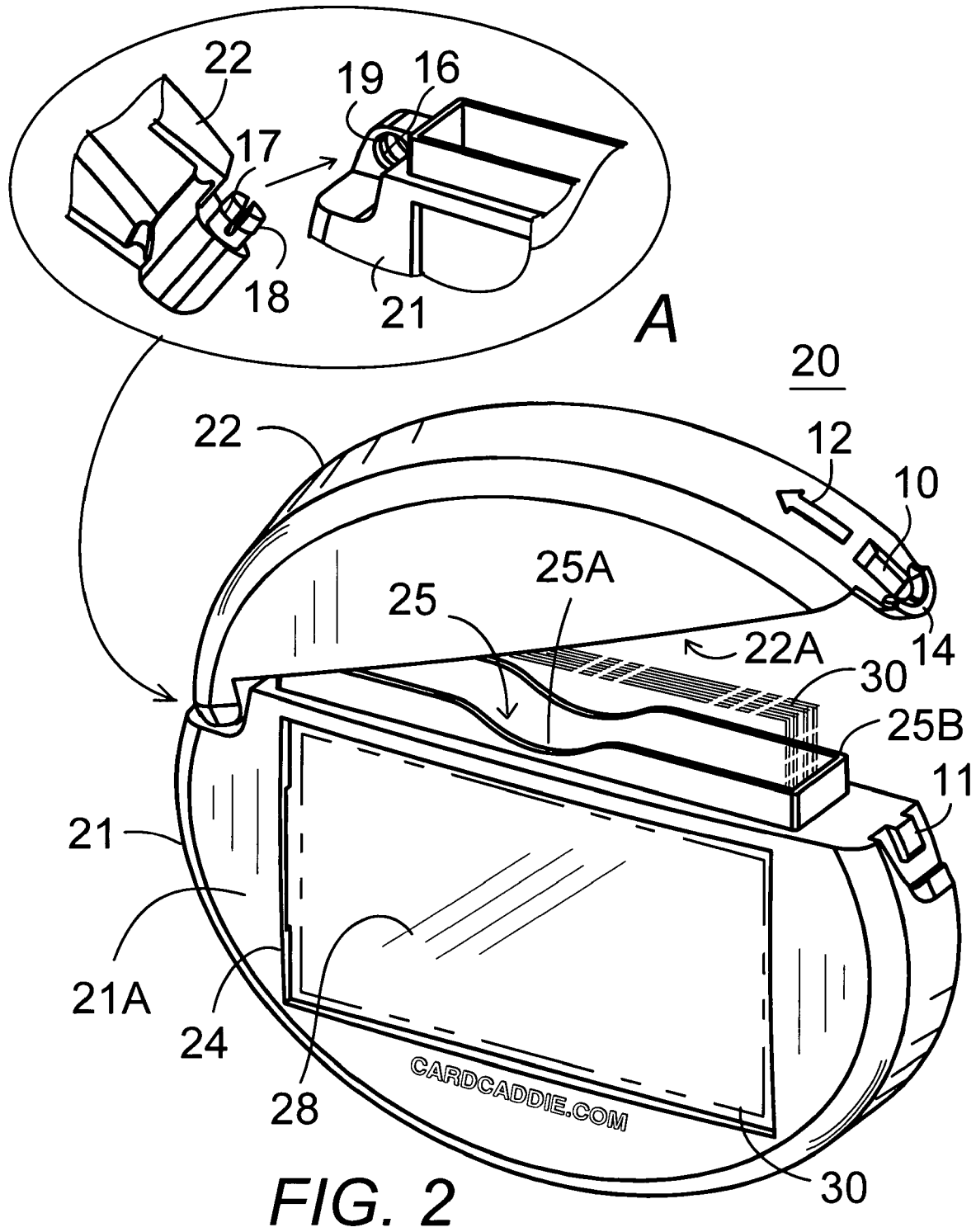
FIG. 2 is a perspective view of the front of the casing of the card holder dispenser of FIG. 1 with the lid partially open showing the recessed front card display window and the opening in the top to admit the cards.
Figure 3:
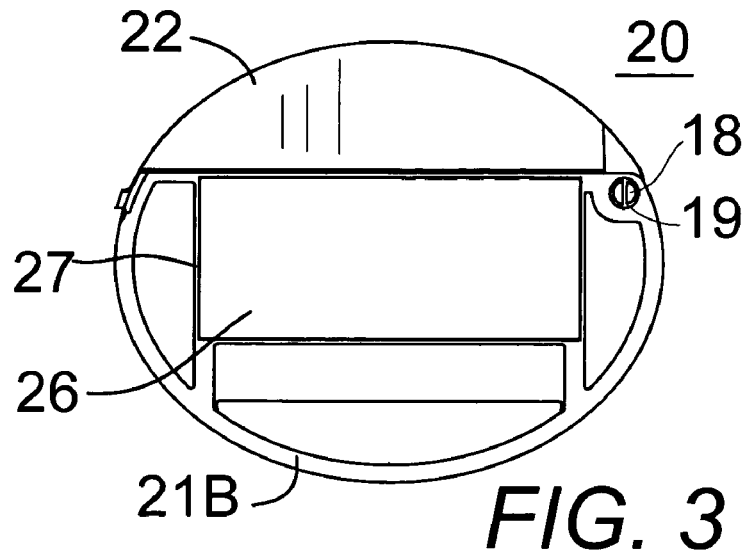
FIG. 3 is an elevational view of the back of the casing of the card holder dispenser of FIG. 1 showing the attaching means on the back of the card holding compartment.
Figure 4:
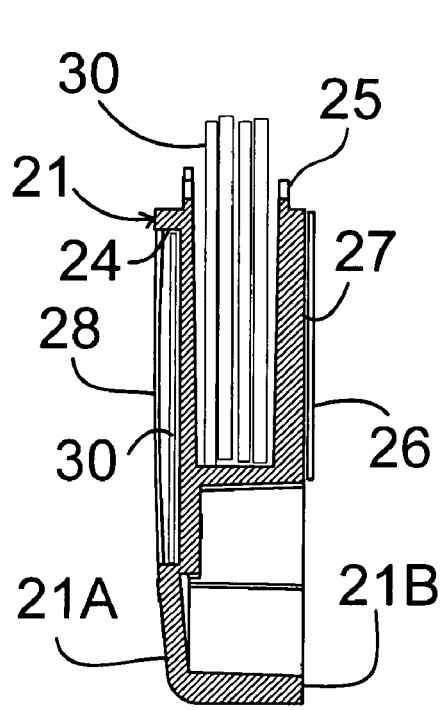
FIG. 4 is a cross-sectional view taken through the transverse centerline of the casing of the card holder dispenser of FIG. 1.
Figure 5:
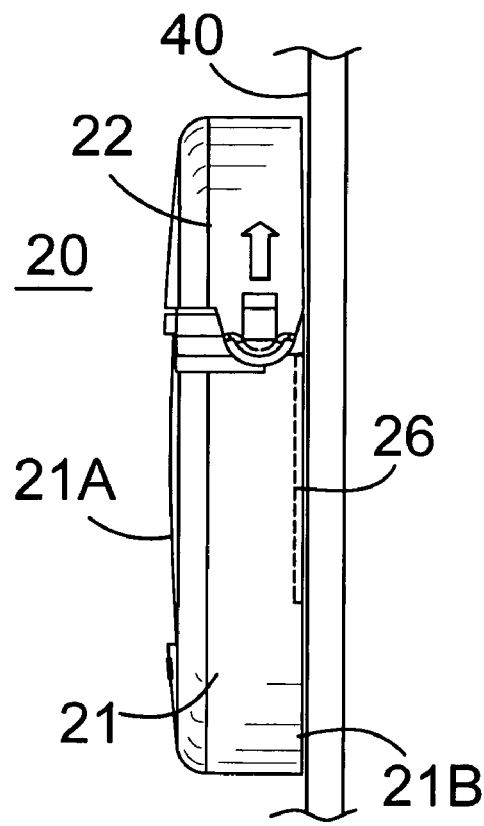
FIG. 5 is an end elevational view of the card holder dispenser of FIG. 1 showing the invention attached to a vertical surface.

In FIGS. 1-5, a card holder and dispenser device 20 is especially adapted with wind and waterproofing for exterior use on moving vehicles 40 and building exteriors 40. The device 20 includes a casing 21 comprising an interior compartment 25 for holding a plurality of cards 30 with a back surface 27 of the interior compartment 25, which may be recessed from the edges of the back surface to receive a mounting means 26 for mounting the device 20 to an exterior vertical surface 40 with the rear casing surface 21B remaining flush to the exterior vertical surface 40, as shown in FIG. 5.

The mounting means 26 for mounting the device 20 to an exterior vertical surface 40 preferably comprises one or more strips of high strength double sticky tape on the smooth back surface 27 of the interior compartment. Alternately, the means for mounting the device to an exterior vertical surface 40 may comprise one or more strips of one side of a mating hook and loop fastener adhered to the indented back portion 27 of the interior compartment 25 to mate with a mating strip of a mating hook and loop fastener adhered to an exterior vertical surface 40. Alternately, the mounting means 26 for mounting the device to an exterior vertical surface 40 may comprises one or more strips of magnets adhered to the indented back surface 27 of the interior compartment to attach to a metal exterior vertical surface 40. The back surface 27 of the interior compartment is preferably indented from the edges of the rear casing surface by the thickness of the mounting means 26 so that the device is flush mounted.

The device 20 also comprises a front casing surface 21A with a recessed front portion 24 adapted to receive a single card 30 therein for display purposes. The recessed front portion 24 has a transparent front covering 28, which is contiguous with and conforms to the shape of the front casing surface 21A, as seen in FIG. 4. The transparent front covering 28 is configured to snap into the recessed front portion 24 with a tight friction fit, having a sealed connection between the transparent front covering 28 and the recessed front portion 24 to prevent wind and water from contacting the display card 30 in the recessed front portion 24.

The device 20 also comprises a lid 22 mounted on the casing 21 by a pivoting means, preferably a split pin 18 with a protruding external ring pivotally snap fit into a hole 19 with an internal circular notch 16 to receive the external ring 17 of the pin, allowing the lid 22 to pivot open and closed, shown in FIG. 2A, for accessing the interior compartment 25 to enable the removal of one or more cards 30 therefrom or loading in more cards. The lid 22 opens and closes with the rear surface of the lid 22 moving along an exterior vertical surface 40 on which the device 20 is mounted.

A snap locking latch to retain the lid closed comprises a protrusion 11 on the casing snap fitting into an opening 10 in the lid 22. An end lifting lip 14 on the lid 22 is lifted up as indicated by an arrow 12 marked on the casing 21 preferably formed in the molding process of making the lid.

An interconnecting means for sealing the interior compartment 25 comprises the casing 21 having an elevated lip 25B around the top of the interior compartment 25 and the lid 22 having a recessed cavity 22A, which receives the elevated lip 25B of the interior compartment 25 with a bottom edge of the lid 22 resting below the elevated lip 25B in contact with the casing 21 in a closed position of the lid 22. The elevated lip 25B of the interior compartment 25 has a front recess 25A in a top portion of the elevated lip 25B to allow accessing a front card 30 in the interior compartment 25.

In practice, a single business card 30 would be placed in the front recessed area 24 of the casing 21 for display purposes. The transparent front covering 28 would be snapped into the recessed front portion 24 with a tight friction fit, thereby forming a sealed connection between the transparent front covering 28 and the recessed front portion 24 to prevent wind and water from contacting the display card 30. The card holding dispenser device 20 would be filled with cards 30 by opening the lid 22 and inserting a plurality of business cards 30 in the interior compartment 25.

The lid 22 would be closed tightly to prevent moisture or wind from damaging the cards 30. The card holding dispenser device 20 would then be mounted to an external vertical surface 40, such as a vehicle window or vehicle exterior body surface or the exterior or window or door of a building thereby allowing a potential customer to view the display card 30 and access the business cards 30 contained within the device 20. The card holding dispenser 20 may be flush mounted to the exterior vertical surface 40 by one or more strips of high strength double-sided sticky tape 26. Alternately, the device 20 may be mounted by mating hook and loop fasteners, one portion adhered to the device 20 and the other portion adhered to the vehicle window 40 or the exterior of the building 40, which when engaged would hold the device 20 in place or mounted by a magnet adhered to the casing for attaching the device to metal, such as a vehicle exterior.

The device 20 may be used to allow more potential customers to view and access the business cards 30, thereby creating greater potential for increased business activities. The device 20 may be attached to a service vehicle or company car parked outside an establishment or parked at other public locations, thereby allowing a potential customer to easily access the company contact information on the business card 30. When attached to the exterior vertical surface 40 of a business establishment, the device 20 allows a potential customer to access company business cards 30 after business hours. A potential customer may easily remove a business card 30 by grasping the front card 30 presented in the indentation 25A in the elevated lip 25B. The device 20 may be refilled with business cards 30 as needed.

It is understood that the preceding description is given merely by way of illustration and not in limitation of the invention and that various modifications may be made thereto without departing from the spirit of the invention as claimed.

What is claimed is:

1. A card holder dispenser device determining adapted for exterior use with wind proofing and waterproofing on moving vehicles and building exteriors, the device comprising:

a casing comprising a rear casing surface configured to attach to and fit flush with an exterior vertical surface, an interior compartment for holding a plurality of cards, the interior compartment comprising a sealed waterproof and windproof storage and dispensing compartment for the plurality of cards placed therein, an outer back surface of the interior compartment having a smooth portion to receive a means for mounting the device to the exterior vertical surface, the smooth portion of the outer back surface located in a recess extending inward from outer peripheral edges of the outer back surface to receive the means for mounting therein for mounting the device to the exterior vertical surface with the peripheral edges of the outer back surface remaining flush to the exterior vertical surface to prevent wind and moisture in between the outer back surface and the external vertical surface, an upwardly extending lip formed by an upward extension of the walls of the interior compartment around an entire perimeter of the interior compartment, the upwardly extending lip spaced apart from the exterior surfaces of the casing, a front casing surface having a recessed portion separate from the interior compartment for receiving a single card in the recessed portion, and a transparent covering snap fit over the recessed portion with a tight friction fit, forming a sealed connection between the transparent covering and the recessed portion for preventing wind and water from contacting the display card in the recessed front portion and for viewing the single card through the transparent covering, the transparent covering being contiguous with and conforming to the shape of the front casing surface for wind proofing the front casing surface; and a lid mounted on the casing between a a snap locking latch between a first end of the lid and a first end of the casing for releasably locking the lid closed and a pivot pin in a hinge pivoting means at a second end of the lid between the lid and a second end of the casing for allowing the lid to pivot open from the first end of the casing and around the second end of the casing so that the lid is operable with the casing mounted in flush contact with the external vertical surface, the lid pivoting around the pivot pin in the hinge at the second end of the casing, the pivot pin oriented transversely to the casing so that the lid is adapted to pivot open vertically in parallel alignment with the casing and in parallel with the external vertical surface for accessing the interior compartment to enable the removal of at least one card therefrom, the lid and casing having an interconnecting means for sealing the interior compartment in a closed position of the lid to prevent wind and water from entering therein, the interconnecting means comprising a recessed cavity in the lid which receives the upwardly extending lip of the interior compartment in a tight friction fit with the recessed cavity and with a bottom edge of the lid resting below the upwardly extending lip in contact with the casing in a closed position of the lid to seal the cards in the interior compartment from wind and water, the lid having a rear lid surface contiguous with the rear casing surface, the rear lid surface configured to fit flush with the exterior vertical surface and a front lid surface contiguous with the front casing surface in a closed position of the lid, thereby forming a card holder dispenser device having wind proofing and waterproofing for exterior use on vehicles and building exteriors.

2. The device of claim 1 wherein the elevated lip of the interior compartment further comprises at least one recess in a top portion of the elevated lip to allow accessing a card in the interior compartment.

3. The device of claim 1 further comprising a snap locking latch between the lid and the casing to retain the lid closed, the latch comprising a protrusion on the casing adapted to snap fit into a mating opening in the lid and an end lifting lip on the lid adapted to be lifted up as indicated by an arrow marked on the casing to release the locking latch.

4. The device of claim 1 wherein the transparent front covering is configured to snap into the recessed front portion with a tight friction fit having a sealed connection between the transparent front covering and the recessed front portion to prevent wind and water from contacting the card in the recessed front portion.

5. The device of claim 1 wherein the means for mounting the device to an exterior vertical surface comprises at least one strip of high strength double sticky tape on the back surface of the interior compartment and the back surface of the interior compartment is indented from the rear surface of the casing by a distance equal to the thickness of the high strength double sticky tape so that the rear surface of the casing is adapted to attach to an external surface with the rear surface of the casing in flush contact with the external surface.

6. The device of claim 1 wherein the means for mounting the device to an exterior vertical surface comprises at least one strip of one side of a mating hook and loop fastener in the rear casing surface indented portion to mate with a mating strip of a mating hook and loop fastener adhered to an exterior vertical surface and the back surface of the interior compartment is indented from the rear surface of the casing by a distance equal to the thickness of the mating hook and loop fastener so that the rear surface of the casing is adapted to attach to an external surface with the rear surface of the casing in flush contact with an external surface.

7. The device of claim 1 wherein the means for mounting the device to an exterior vertical surface comprises at least one strip of magnetic material attached on the back surface of the interior compartment and the back surface of the interior compartment is indented from the rear surface of the casing by a distance equal to the thickness of the at least one strip of magnetic material so that the rear surface of the casing is adapted to attach to an external surface with the rear surface of the casing in flush contact with the external surface.

8. The device of claim 1 wherein the pivoting means comprises a split pin with a protruding external ring adapted to pivotally snap fit into a hole with an internal circular notch to receive the external ring of the pin pivotally snap fit therein so that the lid is adapted to pivot open and closed for accessing the interior compartment, the pin oriented transversely to the casing so that the lid is adapted to pivot open vertically to a side of the casing with the rear lid surface moving along an exterior vertical surface on which the device is mounted.

* * * * *